(12) United States Patent
Patel et al.

(10) Patent No.: US 10,081,704 B2
(45) Date of Patent: Sep. 25, 2018

(54) EPOXY SYSTEMS HAVING IMPROVED FRACTURE TOUGHNESS

(71) Applicant: EVONIK DEGUSSA GMBH, Essen (DE)

(72) Inventors: Pritesh G. Patel, Breinigsville, PA (US); Judith Dolores Espinoza Perez, Longview, TX (US); Gauri Sankar Lal, Whitehall, PA (US); Jared Denis Bender, Breinigsville, PA (US); Edze Jan Tijsma, BV Zeist (NL)

(73) Assignee: Evonik Degussa GmbH, Essen (DE)

( * ) Notice: Subject to any disclaimer, the term of this patent is extended or adjusted under 35 U.S.C. 154(b) by 39 days.

(21) Appl. No.: 15/077,071

(22) Filed: Mar. 22, 2016

(65) Prior Publication Data

US 2016/0280844 A1    Sep. 29, 2016

Related U.S. Application Data

(60) Provisional application No. 62/137,375, filed on Mar. 24, 2015.

(51) Int. Cl.
| | |
|---|---|
| *C08L 63/00* | (2006.01) |
| *C08G 59/40* | (2006.01) |
| *C08G 71/02* | (2006.01) |
| *C08G 18/50* | (2006.01) |
| *C08G 18/38* | (2006.01) |
| *C08G 59/24* | (2006.01) |
| *C08G 59/56* | (2006.01) |
| *C09J 163/00* | (2006.01) |
| *C08L 75/02* | (2006.01) |

(52) U.S. Cl.
CPC ..... *C08G 59/4021* (2013.01); *C08G 18/3829* (2013.01); *C08G 18/5042* (2013.01); *C08G 59/245* (2013.01); *C08G 59/56* (2013.01); *C08G 71/02* (2013.01); *C08L 63/00* (2013.01); *C08L 75/02* (2013.01); *C09J 163/00* (2013.01)

(58) Field of Classification Search
None
See application file for complete search history.

(56) References Cited

U.S. PATENT DOCUMENTS

| | | | |
|---|---|---|---|
| 3,248,424 A | | 4/1966 | Muller et al. |
| 4,178,427 A | * | 12/1979 | Waddill ............ C08G 18/5021 156/327 |
| 4,436,890 A | | 3/1984 | Kaufman et al. |
| 4,521,583 A | | 6/1985 | Kohli |
| 4,886,909 A | * | 12/1989 | Lin ........................ C08G 18/10 564/50 |
| 5,003,004 A | | 3/1991 | Simms |
| 5,053,465 A | | 10/1991 | Waddill |
| 5,278,257 A | | 1/1994 | Mulhaupt et al. |
| 6,998,011 B2 | | 2/2006 | Schoenfeld et al. |
| 7,001,972 B1 | | 2/2006 | Tillack et al. |
| 7,037,217 B2 | | 5/2006 | Harris et al. |
| 7,157,527 B2 | | 1/2007 | Kuntimaddi et al. |
| 7,705,102 B2 | | 4/2010 | Ricci et al. |
| 7,910,656 B2 | | 3/2011 | Lutz et al. |
| 7,951,879 B2 | | 5/2011 | Kramer et al. |
| 2011/0067813 A1 | | 3/2011 | Kramer et al. |
| 2011/0114257 A1 | | 5/2011 | Kramer et al. |
| 2011/0294963 A1 | | 12/2011 | Kuan et al. |
| 2013/0037213 A1 | | 2/2013 | Frick et al. |

FOREIGN PATENT DOCUMENTS

GB    1550733    8/1979

\* cited by examiner

*Primary Examiner* — Ana Lucrecia Woodward
(74) *Attorney, Agent, or Firm* — Andrew H. Chung; Linda S. Li; Jason S. Ngui (57) ABSTRACT

The disclosure relates to at least one partially reacted product of an isocyanate and an amine (e.g., a reaction product comprising at least one adducted compound). The reaction product comprises polyurea oligomers. The reaction product can be combined with at least one amine in order to formulate a curing agent for epoxy resins wherein the cured epoxy resin has enhanced fracture toughness. The at least partially reacted product does not increase the viscosity of the curing agent and is at least partially soluble in the amine component of the curing agent.

9 Claims, 4 Drawing Sheets

Figure 1.

Viscosity profile of PU resin (1:0.3),
graphic includes image of the produced resin.

Figure 2. NMR spectra 15-75ppm

Figure 3. NMR spectra 115-165ppm

Figure 4.

FTIR spectra

EPOXY SYSTEMS HAVING IMPROVED FRACTURE TOUGHNESS

This application claims the benefit of Application No. 62/137,375, filed on Mar. 24, 2015. The disclosure of Application No. 62/137,375 is hereby incorporated by reference.

BACKGROUND OF THE INVENTION

The instant invention relates to curing agents, methods for making the curing agents and their usage for curing epoxy resins.

Epoxy resins are typically brittle and have a low resistant to crack propagation. Extensive research has been generated to develop toughening agents of epoxy resins for high performance structural applications. However, the typical approach to improve the fracture toughness is the addition/pre-reaction of a dispersed phase in the epoxy resin; which implies an extra step in the preparation of thermosets, requiring additional mixing/heating capabilities increasing time and cost of production. The addition of a dispersed phase in the epoxy resin also modifies the viscosity of the resin, which is a critical parameter during the processing of structural applications. Therefore, there is a need in this art for a curing agent which offers the added value to improve fracture toughness without any additional processing step or increased viscosity. There is also a need in this art for an improved curing agent that possesses improved processability while avoiding usage of high viscosity toughening agents, for example, carboxy terminated polybutadine acrylonitrile (CTBN).

Examples of conventional curing agents and epoxy systems are disclosed in U.S. Pat. Nos. 5,003,004; 5,053,465; 5,278,257; 6,998,011; 7,037,217; 7,157,527; 7,705,102; 7,910,656; 7,951,879; and US Pub Nos 2011/0067813; 2011/0014257; 2011/0294963; and 2013/0037213. The disclosure of the foregoing patents and patent applications is hereby incorporated by reference.

BRIEF SUMMARY OF THE INVENTION

The instant invention solves problems associated with conventional curing agents by providing at least one partially reacted product of an isocyanate and an amine (e.g., a reaction product comprising at least one adducted compound). The reaction product comprises polyurea oligomers. The reaction product can be combined with at least one amine in order to formulate a curing agent for epoxy resins wherein the cured epoxy resin has enhanced fracture toughness. The at least partially reacted product does not increase the viscosity of the curing agent and is at least partially soluble in the amine component of the curing agent.

Without wishing to be bound by any theory or explanation, it is believed that when the curing agent reacts with epoxy resin, oligomers present in curing agent form a network with micro domains or phases within the cured epoxy resin that imparts ductility thereby increasing the fracture toughness of the cured epoxy.

One aspect of the invention relates to an epoxy curing agent comprising at least one polyurea oligomer wherein the oligomer comprises an adduct of at least one isocyanate and at least one diamine.

Another aspect of the invention relates to any of the foregoing aspects of the invention that further comprises at least one amine.

Another aspect of the invention relates to any of the foregoing aspects of the invention wherein the isocyanate comprises at least one cycloaliphatic diisocyanate.

Another aspect of the invention relates to any of the foregoing aspects of the invention wherein the polyurea oligomer is at least partially soluble in aliphatic amine.

Another aspect of the invention relates to any of the foregoing aspects of the invention wherein the diamine comprises at least one member selected from the group consisting of polytetramethyleneoxide-di-p-aminobenzoate, polytetraethyleneoxide-di-p-aminobenzoate, polytetrapropyleneoxide-di-p-aminobenzoate, and polytetrahexyleneoxide-di-p-aminobenzoate.

A further aspect of the invention relates to any of the foregoing aspects of the invention wherein the amine comprises at least one member selected from the group consisting of diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine ($N_3$-Amine), N, N'-1,2-ethanediylbis-1,3-propanediamine ($N_4$-amine), and dipropylenetriamine.

One aspect of the invention relates to any of the foregoing aspects of the invention and a method for making the epoxy curing agent which comprises contacting at least one isocyanate and an excess of at least one diamine under conditions sufficient to produce a liquid polyurea oligomer.

Another aspect of the invention relates to any of the foregoing aspects of the invention and a composition comprising at least one epoxy resin and the curing agent.

A further aspect of the invention relates to an epoxy resin article obtained from the composition of the foregoing compositions and methods having a fracture toughness of about 1200 psi in$^{1/2}$ to about 2800 psi in$^{1/2}$.

The various aspects of the invention can be used alone or in combinations with each other.

DETAILED DESCRIPTION OF THE INVENTION

The instant invention relates broadly to compositions and processes for producing a reaction product comprising a polyurea oligomer. The polyurea oligomer can be produced by at least partially reacting at least one isocyanate in the presence of an excess amount of at least one amine. The polyurea oligomer reaction product can be dissolved in at least one amine thereby producing a curing agent for curing epoxy resins to improve fracture toughness.

A polyurea oligomer can be synthesized by mixing and at least partially reacting an oligomeric diamine with a cycloaliphatic diisocyanate in the presence of excess of diiamine (off-stoichiometric). The excess diamine can function as a solvent for the polyurea reaction product to obtain a liquid resin. By "liquid" it is meant that the reaction product has a viscosity of less than about 150,000 cps, about 100,000 cps and in some cases less than about 50,000 cps when measured by Brookfield viscometer under ambient conditions (25° C.).

The polyurea oligomer reaction product can be at least partially dissolved in at least one aliphatic amine. The resultant polyurea oligomer solvated with aliphatic amine can be used as a curing agent for an epoxy resin. The cured epoxy resin has improved thermal and mechanical properties. The cured epoxy resin can comprise domains or phases which in turn can improved the fracture toughness. By "fracture toughness" or "toughness" it is meant the resistance of a material to crack propagation wherein the crack is called "fracture" and absorbs energy and is measured in accordance with ASTM D5045 using an Instron testing machine. An epoxy resin cured with the inventive curing agent can have a fracture toughness of about 200 psi in$^{1/2}$ to about 7000 psi in$^{1/2}$, about 500 psi in$^{1/2}$ to about 5000 psi in$^{1/2}$ and in some cases about 2000 psi in$^{1/2}$ to about 3000 psi in$^{1/2}$.

While any suitable diamine can be employed to produce the oligomeric polyurea product, examples of suitable diamines comprise at least one member selected from the group selected from Polytetramethyleneoxide-di-p-aminobenzoate (available commercially as Versalink® P-650), Polytetraethyleneoxide-di-p-aminobenzoate, Polytetrapropyleneoxide-di-p-aminobenzoate, and Polytetrahexyleneoxide-di-p-aminobenzoate. Examples of suitable diisocyanates comprise at least one member selected from the group consisting of Methylenediphenyldiisocyanate (MDI), toluenediisocyanate (TDI)-, and Isophoronediisocyanate (IPDI). The reaction takes place in the presence of excess of amine and is off-stoichiometry. The amine:isocyanate stoichiometric ratio is about 1:<0.7, about 1:<0.5 and in some cases about 1:<0.3. The excess of amine acts as a solvent in situ thereby allowing the production of a liquid resin. At an amine:isocyanate stoichiometric ratio of 1:1, resultant polyurea is more likely a solid polymer, and any attempt to dissolve it would require additional processing efforts such as using solvents and mixing.

In one aspect of the invention, the inventive polyurea is a polymer that is prepared in situ by reaction of isocyanates with amines to produce urea groups that interact by hydrogen bonding. The reaction can be carried out at low temperatures and byproducts are typically not produced. The reaction temperature, at atmospheric pressures, can range from about 0 C-80 C to about 40 C-60 C, about 55 to about 60 C and in some cases about 60 C to about 65 C. While any suitable equipment can be used for conducting the reaction, an example comprises a three neck round bottom flask equipped with heating mantle, addition funnel, and temperature controller The structure of the inventive polyurea has a hard segment (isocyanate domains) embedded within a flexible matrix (amine chains) (e.g., as shown by the reaction scheme below). This chemical structure can be used to improve fracture toughness in thermosetting polymers, because while the soft segment impacts the fracture toughness, and the hard segment will control the reduction of stiffness in the system.

The Example above shows the structures of an isocyanate, amine oligomer and the produced polyurea. An example of an Isocyanate comprises polycarbodiimide-modified diphenylmethane diisocyanate (e.g., Isonate® 143L, available from Dow Chemicals); and an amine oligomer comprises Poly(tetramethylene oxide-di-p. aminobenzoate) (Versalink® P1000, available from Air Products and Chemicals, Inc).

The inventive reaction product is combined with any suitable amine wherein the reaction product is at least partially soluble in the amine. Examples of suitable amines comprise at least one member selected from the group consisting of diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine (N$_3$-Amine), N, N'-1,2-ethanediylbis-1,3-propanediamine (N$_4$-amine), and dipropylenetriamine. The amount of amine can range from about 5 to about 80, about 10 to about 50 and in some cases about 5 to about 20 wt. % of a curing agent. By soluble it is meant that the inventive polyurea oligomer is at least partially and typically completely dissolved in to the amine as measured by visual observation (i.e no phase separation is observed).

In one aspect of the invention, the inventive curing agent can be used in combination with at least one member selected from the group consisting of rubbers, thermoplastics, rigid particulate inorganic fillers such as silica, silicates, nanosized particles and block copolymers, to form a dispersed phase within the cured epoxy resin. One particular example of dispersed phases can comprise at least one member selected from the group of rubber system of copolymers of butadiene and acrylonitrile, that are commercially available with acrylonitrile content from about 0 to about 26 wt %. These copolymers are available with carboxy-terminated (CTBN), amino-terminated (ATBN), epoxy-terminated (ETBN), and vinyl-terminated (VTBN) functionalities, poly(ether sulfone)s, poly(ether ketones)s, and poly (ether imide)s, block copolymers (modified rubber systems). When employed, the amount of dispersed phase can comprise about 5 to about 30% by wt, about 8 to about 20% by wt and in some cases about 5 to about 10% by wt of the cured epoxy.

In another aspect of the invention, the inventive curing agent and cured epoxy resin are substantially free from members of the following group rubbers, thermoplastics, rigid particulate inorganic fillers such as silica, silicates, nanosized particles and block copolymers, that form a dispersed phase within the cured epoxy resin. By "substantially free" it is meant that the curing agent as well as the cured epoxy resin contains less than about 1.0, about 0.5 and in some cases less than about 0.1 of such members.

In another aspect of the invention, the inventive curing agent, methods for making the curing agent and the epoxy resin are substantially free of solvents. By "substantially free" it is meant that, except for diamine solvating the inventive polyurea, the foregoing contain less than about 5%, about 1% and in some cases about 0 wt. % of other solvents. Examples of solvents that can be avoided by the instant invention include DMF (dimethylformamide), NMP, Aceton, methyle chloride, among others.

The inventive curing agent can be employed for curing any suitable epoxy. The epoxy resin may include, but is not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

One class of epoxy resins suitable for use in the present disclosure comprises the glycidyl ethers of polyhydric phenols, including the glycidyl ethers of dihydric phenols.

Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the following structure also are useful in the present disclosure:

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, m-xylene dianiline, hydantoin, and isocyanate.

The epoxy component may be at least one cycloaliphatic (alicyclic) epoxide. Examples of suitable cycloaliphatic epoxides include diepoxides of cycloaliphaitc esters of dicarboxylic acids such as bis(3,4-epoxycyclohexylmethyl) oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in Patent No. WO 2009/089145 A1, which is hereby incorporated by reference in its entirety.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohexylmentyl-3,4-epoxycyclohexane carboxylates are described, for example, in U.S. Pat. No. 2,890,194, which is hereby incorporated by reference in its entirety. In other embodiments, the epoxy component may include polyol polyglycidyl ether from polyethylene glycol, polypropylene glycol or polytetrahydrofuran or combinations thereof.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used for structural formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the present disclosure. In another aspect, the multifunctional epoxy resin has an EEW in a range from about 170 to about 250.

Depending upon the end-use application, it can be beneficial to reduce the viscosity of the compositions of the present disclosure by modifying the epoxy component. The epoxy component, which comprises at least one multifunctional epoxy resin, further comprises a monofunctional epoxide. Examples of monoepoxides include, but are not limited to, styrene oxide, cyclohexene oxide and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof. The amount of multifunctional epoxy resin can range from about 0 to about 100% and typically about 10% to about 30%.

The ratio of curing agent to epoxy varies depending upon the intended use of the epoxy. The ratio will typically range from about 1:0.05 to about 1:5, about 1:3 to about 1:5 and in some cases about 1:2 to about 1:3.

The cured epoxy resins of the invention can be used in a wide range of uses including, adhesives and sealants; in protective coatings for appliances, flooring, and industrial equipment; in structural components, such as laminates and matrices for glass reinforced, high-strength composites for aerospace, pipes, tanks, pressure vessels, tooling; and in encapsulation or casting of various electrical and electronic components.

The following Examples are provided to illustrate certain aspects of the invention and do not limit the scope of the appended claims.

EXAMPLE 1

Synthesis of Polyurea (PU) Resin

To study the effect of the amine:isocyanate stoichiometry in the rheology of the produced resin. The result of this experiment allowed defining the amine:stoichiometric ratio at which the PU resin was liquid; which facilitated its further mixing in amine curing agents without a solvent.

Method. Oligomeric diamine (Versalink P650) was manually mixed with hydrogenated methylene diphenyl diisocyanate (HMDI, Desmodur W) in a 250 mL beaker at amine: isocyanate molar ratios 1:0.3, 1:0.5, and 1:1. The beaker was sealed and stored at 60° C. for 12 h.

Results. At 1:1 and 1:0.5 stoichiometric ratios the produced resins were solid, while the resin at 1:0.3 ratio resulted in pale yellow resin with a honey-like consistency, with a viscosity of $2 \times 10^5$ cP at 25° C. This liquid polyurea (1:0.3) was therefore selected for its further mixing with amine curing agents.

Figure 1:
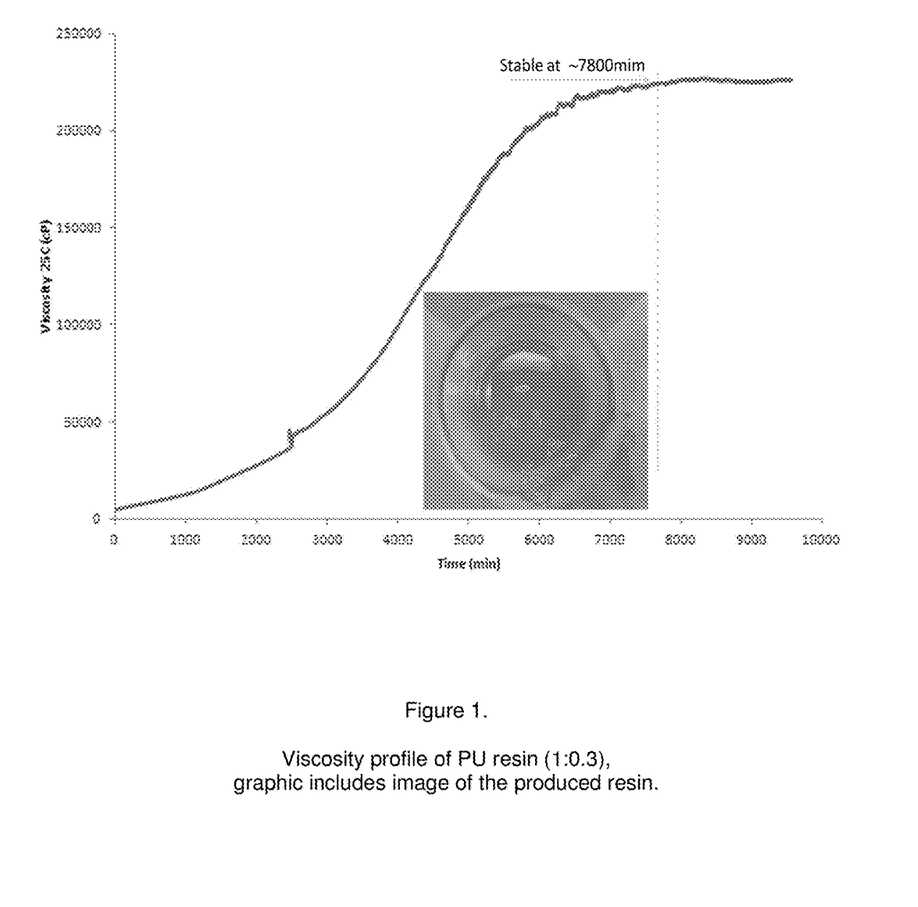
FIG. 1 is a viscosity profile of polyurethane resin (1:0.3) produced in accordance with Example 1.

Referring now to FIG. 1, FIG. 1 shows the viscosity profile of PU resin (1:0.3).

EXAMPLE 2

Solubility of the PU Resin in an Aliphatic Amine Curing Agent

Objective. To evaluate solubility of synthesized PU resin in an amine curing agent.

Method. The synthesized PU resin (1:0.3) of Example 1 with an AHEW of 649 g/eq was dissolved in an aliphatic amine curing agent (Ancamine® 2655, available from Air Products and Chemicals, Inc.) at a weight ratio amine:PU 85:15. The PU resin was mixed manually for 5 min at room temperature.

Results. The PU resin was successfully dissolved into Ancamine 2655 and the presence of PU did not affect the viscosity of the amine. In particular, the mixed product viscosity PU+amine was 100-120 cps and suitable for use with an epoxy resin.

EXAMPLE 3

Stability of the PU Resin

Objective. To monitor the stability of the PU resin versus time.

Method. The viscosity profile of a batch of PU resin at an amine:stoichiometric ratio 1:0.3 prepared was been monitored periodically. A 12 g sample of the PU resin is place in a thermocell at room temperature (25° C.), viscosity is recorded after 10 min to achieve a stable reading.

Results. After 11 months, results have not shown significant changes in viscosity (i.e., the 11 month viscosity was about 120-150 cps); which demonstrate the stability of the synthesized resin.

Stability of the Amine-PU Curing Agent

Objective. To monitor the stability of the Amine-PU curing agent a) at low temperature and b) versus time.

Method. A fresh batch of amine-PU curing agent was stored at −12° C. for 24 h. After that period of time, the batch was allowed to thaw at room temperature. The sample was visually inspected and not significant changes were noticed; additionally FTIR spectra before and after the sample was frozen confirmed that not change occurred. In the other hand, the stability of the amine-PU curing agent versus time showed a change in color from pale yellow of the fresh batch to a more concentrated yellow color after 11 months.

EXAMPLE 4

Chemical Characterization of the Synthesized PU Resin

Objective. To perform the chemical characterization of the synthesized PU resin.
a) Gel permeation chromatography (GPC)
b) Near infrared spectroscopy (NIR), and
c) Fourier transform infrared spectroscopy analysis (FTIR)/AP

GPC

Method. The molecular weight distribution of the synthesized PU resin was determined using a GPC. The resin was diluted with the mobile phase (tetrahydrofuran/diethylamine 80%/20%) at 0.3% (wt/vol). The sample was placed on a wrist action shaker for 30 minutes. Upon visual inspection, the sample appeared to be dissolved in the diluent and it was filtered through a 0.45 μm filter prior to being injected into the chromatograph. The chromatographic system consisted of a liquid chromatograph (Waters Alliance 2795), a refractive index detector (Waters 2414), and a three column set (250×10 mm Jordi gel DVB 500 Å). The instrument was calibrated using narrow polystyrene (PS) ranging from 162-~39 k Daltons. The results are relative to PS and not absolute. This means that the results could differ significantly than the absolute values. The analysis was carried with an injection volume of 100 μL at 35° C. and a flow rate of 1 mL per minute of the mobile phase for 55 minutes. The results were determined from the average of two replicate injections.

Results. The weight-average molecular weight (Mw) and number-average molecular weight (Mn) of the resin were 2490 g/mol and 1580 g/mol, respectively, with molecular weight distribution of 1.6.

NMR

Method. The chemical composition of the synthesized PU resin was determined by using NMR. The synthesized resin was dissolved in chloroform-d with chromium acetylacetonate added as a relaxation agent. The NMR experiments were performed at ambient temperature employing the Bruker Avance III 500 FT-NMR spectrometer equipped with a 10 mm BBO probe. Quantitative $^{13}C$ NMR data was acquired using inverse-gated decoupling, a 30° pulse, and a 6 second relaxation delay. The chemical shift scale was referenced to the solvent peak.

Figure 2:
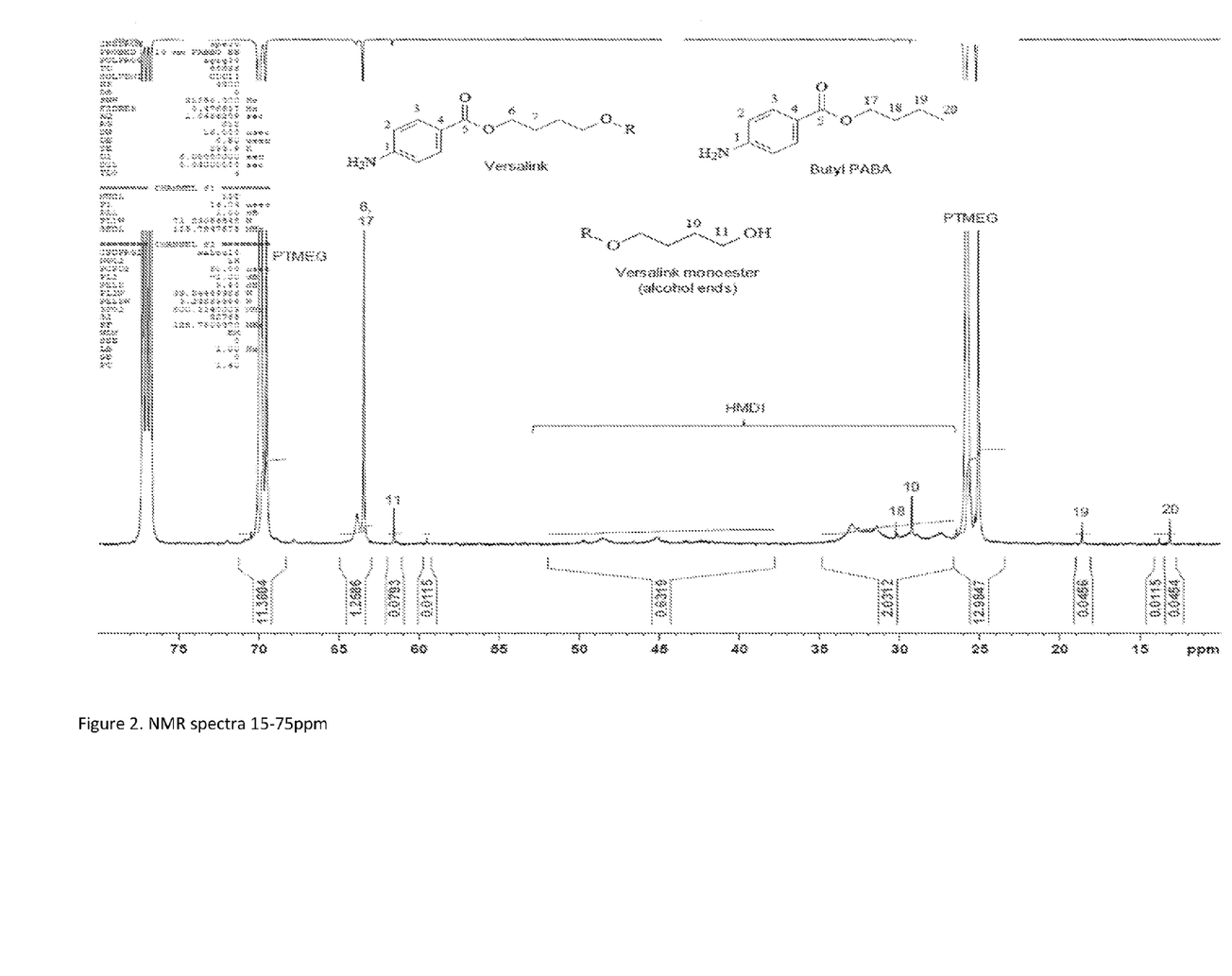
FIGS. 2 and 3 are NMR spectra of the resin produced in accordance with Example 4.
Figure 3:
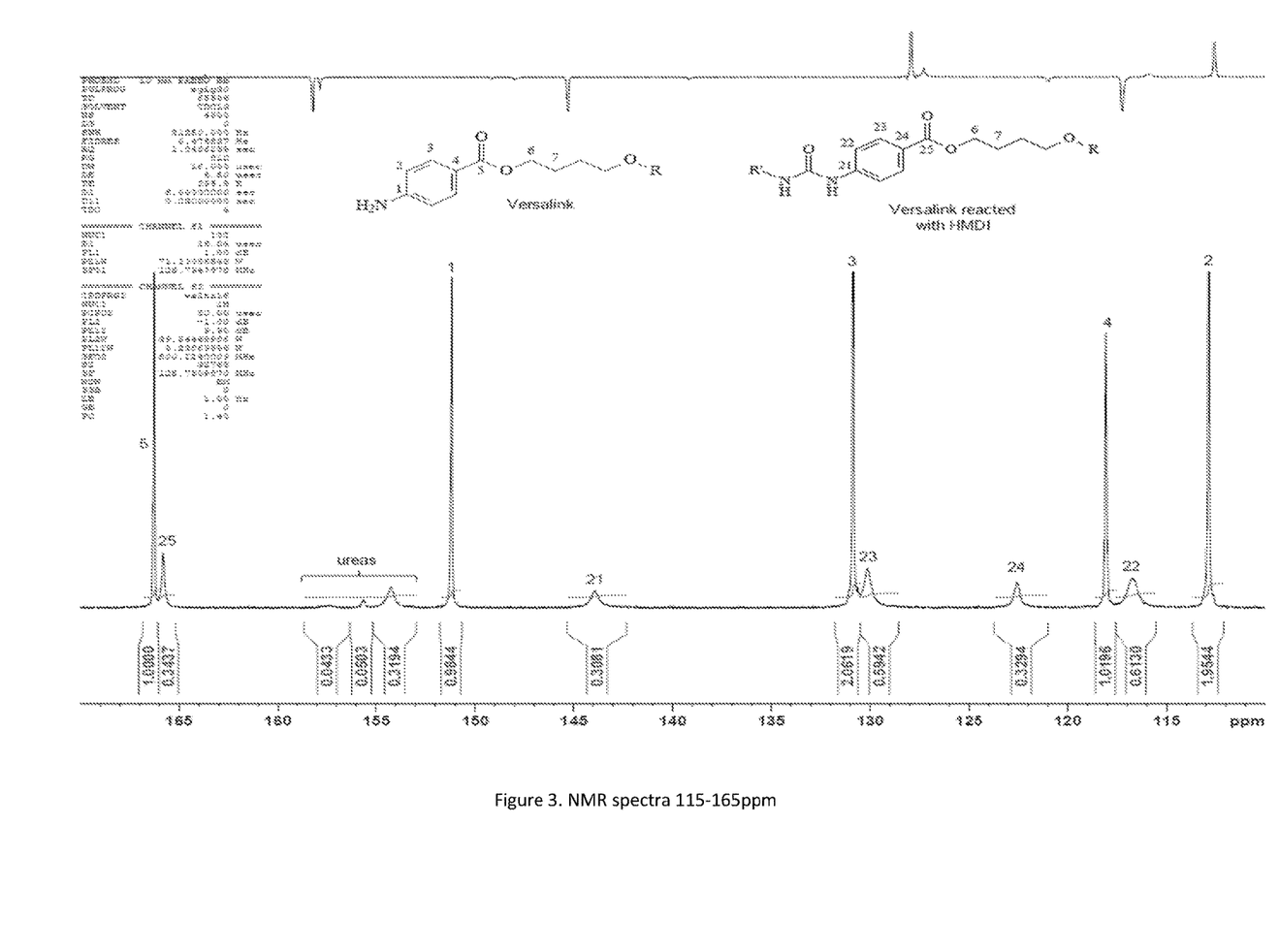

Results. The NMR spectrum confirmed that the resin contained Versalink P650 and polyurea, product of the reaction of Versalink P650 with HMDI (i.e., as shown in FIGS. 2-3). The determined overall composition of the resin was 92% of Versalink P650 reacted and unreacted molecules and 8% HMDI all reacted. The extent of reaction of Versalink P650 was 76% and 24% of unreacted and reacted aromatic rings respectively. Each end of the Versalink molecule has an aromatic amine which can react with the isocyanate. However, those ends are far apart, and reaction at one end does not affect NMR chemical shifts at the other end. It is therefore only possible to determine the percentage of the aromatic amines that have reacted, and not to determine the relative amounts of unreacted, mono-reacted, and di-reacted Versalink. In the case of HMDI the extent of reaction was 100% of reacted isocyanates.

FTIR

Figure 4:
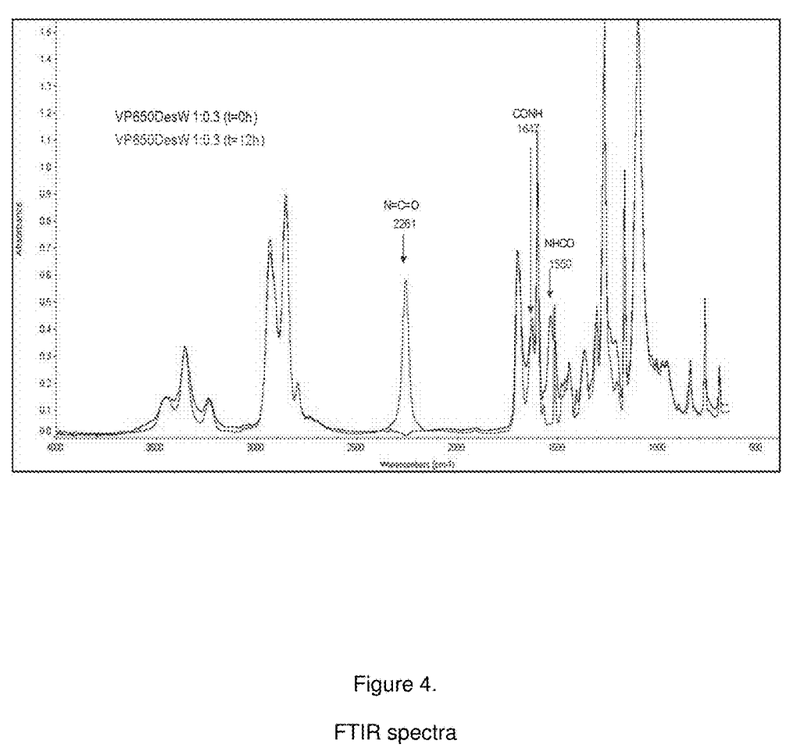
FIG. 4 is an FTIR scan of the resin produced in accordance with Example 4.

Results. The chemical composition was determined by using FTIR. FIG. 4 shows the FTIR scans of the synthesized PU resin at the initial (t=0 hours) and final time (t=12 hours) of reaction. The absence of the peak at 2251 cm$^{-1}$ in the scan at t=12 hours indicates complete reaction of the HMDI, while peaks at 1647 cm$^{-1}$ and 1550 cm$^{-1}$ indicated the formation of polyurea.

EXAMPLE 5

Castings: Thermo-Mechanical Properties

Objective. To prepare cured epoxy-amine-PU castings for their further thermo-mechanical characterization including the evaluation of fracture toughness.

Method. Different curing agents were formulated by manually mixing at room temperature the PU resin with different aliphatic amine curing agents as shown in Table 1. The resulting curing agents were used to cure epoxy resin (epoxy equivalent weight 180 g/eq). The epoxy component and amine curatives described above were manually mixed at room temperature for 5 minutes. The mixture was centrifuged for 5 minutes to remove entrapped air. The mixture was then poured aluminum molds. The system in the mold was cured at 100° C. for 2 hours. Molds were allowed to cool to room temperature before removing the cured sample. Specimens were prepared from the cast samples according to ASTM methods; tensile test (ASTM D638), flexural test (ASTM D790), Izod impact (ASTM 256) and fracture toughness (ASTM D5045).

Results. The resulting cured PU-systems clearly showed a phase separation indicated by the white-milky-opaque color in comparison with controls (0% PU) which showed a white-clear-transparent appearance. The presence of phase separation is not a synonym of an improvement in fracture toughness, so the analysis of the mechanical performance of the samples is required. A summary of the mechanical properties for the prepared epoxy-amine-PU systems is included in Table 1. The fracture toughness of the PU-systems showed a significant improvement when compared with the control-systems (0% PU) with a slight reduction of stiffness and not significant change in modulus. The results of the elongation (%) and the Izod test confirmed the improvement in fracture toughness, as both tests showed significant higher values in the PU systems compared to the control systems.

TABLE 1

Epoxy-amine PU formulations and mechanical properties of castings

| | Formulation | | | | | |
|---|---|---|---|---|---|---|
| | 1 | 2 | 3 | 4 | 5 | 6 |
| PU Resin | — | 15 | — | 15 | — | 15 |
| Ancamine 2655 | 100 | 85 | — | — | — | — |
| TETA | — | — | 100 | 85 | — | — |
| Ancamine 1922 | — | — | — | — | 100 | 85 |
| EPON 826 | 100 | 100 | 100 | 100 | 100 | 100 |
| phr used | 16 | 30 | 15 | 28 | 31 | 46 |
| Mechanical Properties | | | | | | |
| Tensile Strength(psi) | 9730 | 7973 | 11645 | 10507 | 7720 | 7475 |
| Tensile Modulus (ksi) | 262 | 375 | 389 | 385 | 347 | 360 |
| % Elongation at break | 6 | 12 | 7 | 11 | 16 | 17 |
| Flexural Strength (ksi) | 18 | 16 | 19 | 17 | 13 | 12 |
| Flexural Modulus(ksi) | 405 | 394 | 394 | 396 | 347 | 373 |
| Izod Impact (notched) (J/m) | 563 | 868 | 281 | 417 | 991 | 1211 |
| $K_{1C}$ (psi in$^{1/2}$) | 677 | 1706 | 729 | 1207 | 1949 | 2824 |

The previous Examples demonstrate that the inventive curing agent can impart improved impact properties while having little to no affect on other mechanical properties.

EXAMPLE 6

A polyurea reaction product was produced by reacting hydrogenated methylene diisocyanate with an oligomeric diamine following the method described in Example 1.

Oligomeric diamine (Versalink® P650) was manually mixed with hydrogenated methylene diphenyl diisocyanate (HMDI, Desmodur W) in a 250 mL flask at amine:isocyanate weight ratio of 228:22. The flask was sealed and stored at 60° C. for 15 h. The reaction product was analyzed by FT-IR and the isocyanate peak at 2250 cm$^{-1}$ had disappeared after 15 h.

Method:

Curing agent blends were prepared as shown in the Table 2 below.

TABLE 2

| | Composition | | | | | | | | |
|---|---|---|---|---|---|---|---|---|---|
| | 132N | 178L | 178P | 178Q | 178G | 178R | 178V | 178W | 178K |
| DETDA | 65 | 55 | 50 | 45 | 65 | 65 | 60 | 60 | 55 |
| PACM | 30 | 30 | 30 | 30 | 30 | 30 | 30 | 30 | 30 |
| DICY | 0.5 | 0.5 | 0.5 | 0.5 | 0.5 | 0.5 | 0.5 | 0.5 | 0.5 |

TABLE 2-continued

| | Composition | | | | | | | | |
|---|---|---|---|---|---|---|---|---|---|
| | 132N | 178L | 178P | 178Q | 178G | 178R | 178V | 178W | 178K |
| Ancamide ® 910 | 4.5 | 7.25 | 9.75 | 12.25 | | | | | |
| Versalink ® P650 | | 7.25 | 9.75 | 12.25 | | | | | |
| PU resin | | | | | 4.5 | 4.5 | 9.5 | 9.5 | 14.5 |
| Use level (phr) | 25 | 29 | 30 | 32 | 26 | 24 | 27 | 25 | 29 |

The glass transition temperature characteristics of the epoxy resin systems were evaluated by using differential scanning calorimetry (DSC). Briefly, liquid epoxy resin was mixed with the curing agent blends for about 60 sec using a high speed laboratory mixer. Small samples (5-15 mg) were poured in DSC pans and the pans, in triplicate, were immediately placed in the DSC. The following DSC method was used:

1. Equilibrate at 20° C.
2. Heat from 20° C. to 250° C. with 10° C./min (Curing scan)
3. Cool from 250° C. to 20° C. with 10° C./min
4. Equilibrate at 20° C.
5. Heat from 20° C. to 250° C. with 10° C./min (Second heating scan)

The glass transition temperature Tg was determined from the second heating scan and was taken as the midpoint of the transition.

Mechanical properties, in particular flexural properties, were determined in accordance with ASTM D 790. It is preferred that, when using the inventive curing agent the Tg does not decrease. For the compositions of Table 2 this implies that the Tg should not be below 140° C. (Tg of 132 N reference).

Results: The flexural properties obtained with the blends of Table 2, as shown in Table 3 below, pointed out that flexural modulus increased with the addition of Versamid P-650 to the CA formulation. It should be noted that UAX-132N is the reference (no toughener). The addition of Versalink® P650 to the CA formulation had a negative impact on the Tg as shown in Table 3.

TABLE 3

| | Composition | | | |
|---|---|---|---|---|
| | 132N Ref | 178L Comp | 178P Comp | 178Q Comp |
| Flexural modulus (MPa) | 2270 | 2457 | 2364 | 2570 |
| Tg (° C.) | 143 | 139 | 137 | 130 |

Using the inventive curing agent comprising the PU resin, the flexural properties also improved versus UAX-132N, as shown in Table 4 below. Unexpectedly, the use of small amounts (4.5 and 9.5% for UAX-178G and 178V, respectively) of the inventive polyurea containing curing agent formulation had a positive effect on the Tg: Tg did not decrease, but results pointed at an increase in Tg (see Table 4 below).

TABLE 4

| | Composition | | | | | |
|---|---|---|---|---|---|---|
| | 132N Ref | 178G | 178R | 178V | 178W | 178K |
| Flexural modulus (MPa) | 2270 | 2374 | 2532 | 2368 | 2583 | 2447 |
| Tg (° C.) | 143 | 153 | 136 | 147 | 133 | 143 |

These Examples demonstrate that the inventive curing agent comprising a polyurea can be formulated in order to obtain a cured epoxy resin having improved flexural properties without having a negative impact on the Tg. The inventive curing agent can be employed for producing a cured epoxy resin having a Tg of about 50 C to about 200 C, about 100 C to about 200 C and in some cases about 125 C to about 175 C.

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An epoxy curing agent comprising at least one liquid polyurea oligomer and at least one polyamine, wherein the oligomer comprises an adduct of an isocyanate and aromatic diamine selected from the group consisting of polytetramethyleneoxide-di-p-aminobenzoate, polytetraethyleneoxide-di-p-aminobenzoate, polytetrapropyleneoxide-di-p-aminobenzoate, and polytetrahexyleneoxide-di-p-aminobenzoate.

2. The curing agent of claim 1 wherein the range of isocyanate to aromatic diamine to form the polyurea oligomer is from 0.3:1 to 0.5:1.

3. The curing agent of claim 1 wherein the isocyanate comprises at least one cycloaliphatic diisocyanate.

4. The curing agent of claim 1 wherein the isocyanate comprises at least one member selected from the group consisting of methylenediphenyldiisocyanate (MDI), toluenediisocyanate (TDI), and isophoronediisocyanate (IPDI).

5. The curing agent of claim 1 wherein the polyurea oligomer is at least partially soluble in aliphatic amine.

6. The curing agent of claim 1 wherein the polyamine comprises at least one member selected from the group consisting of diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine ($N_3$-Amine), N,N'-1,2-ethanediylbis-1,3-propanediamine ($N_4$-amine), and dipropylenetriamine.

7. A method for producing the epoxy curing agent of claim 1 comprising contacting at least one isocyanate and an excess of at least one aromatic diamine to produce at least one liquid polyurea oligomer, and further contacting the at least one polyurea oligomer with at least one polyamine.

8. The curing agent of claim 2 wherein the range of isocyanate to aromatic diamine to form the polyurea oligomer is 0.3:1.

9. The curing agent of claim 2 wherein the range of isocyanate to aromatic diamine to form the polyurea oligomer is 0.5:1.

* * * * *